Figure 1:
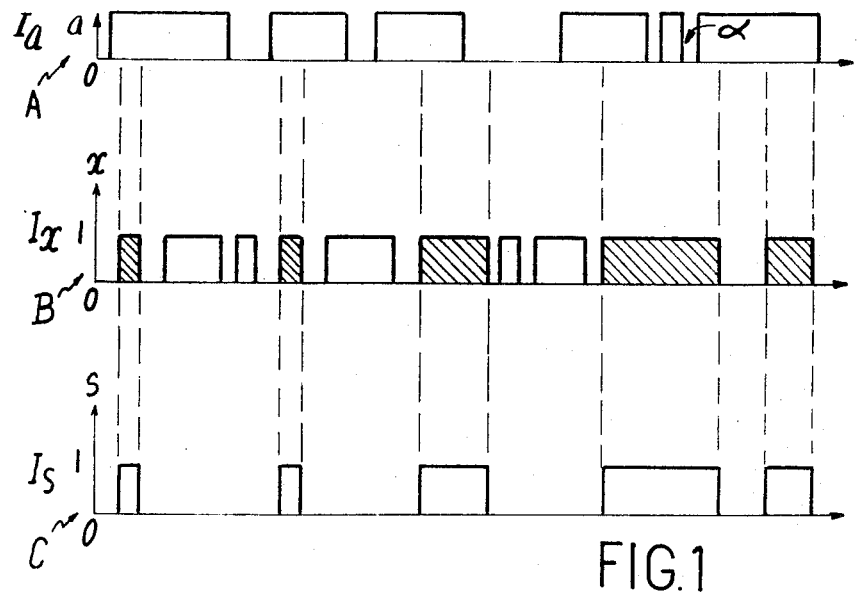

United States Patent
Chicheportiche et al.

[15] 3,662,273
[45] May 9, 1972

[54] APPARATUS FOR SAMPLING RAMDOM PULSE

[72] Inventors: Armand Chicheportiche, Orsay; Rene Louis Vallee, Chilly-Mazarin; Pierre Vergez, Massy, all of France

[73] Assignee: Commissariat A l'Energie Atomique, Paris, France

[22] Filed: June 24, 1970

[21] Appl. No.: 49,426

[30] Foreign Application Priority Data

July 7, 1969 France......................6922984

[52] U.S. Cl................................328/151, 307/218, 318/93
[51] Int. Cl.................................................H03k 17/00
[58] Field of Search...............307/232, 234, 238, 237, 218; 328/151, 132, 93

[56] References Cited

UNITED STATES PATENTS 3,327,226  6/1967  Nourney..........................307/233 X
3,456,201  7/1969  Zrubek.............................328/151 X
3,524,994  8/1970  Ritter...............................328/151 X Primary Examiner—John S. Heyman
Assistant Examiner—B. P. Davis
Attorney—Craig, Antonelli & Hill

[57] ABSTRACT

An apparatus for sampling a train $I_r$ of pulses of random duration and position wherein, the sampling operation being controlled by the pulses of a second train $I_n$ of pulses of the same type, the pulses of both trains excite a combinational device which in turn drives the reset and set inputs of a flip-flop unit having four stable states of equilibrium the pulses of both trains also excite a second combinational device which drives one of the inputs of a bistable unit, the complement of the output quantity of the flip-flop unit is fed back to the input of the second combinational device, the output quantity of the bistable unit is fed back to the input of the first combinational device, and the output of the bistable unit as well as the first train of random pulses are applied respectively to the two inputs of an AND circuit which selects the sampled pulses.

4 Claims, 4 Drawing Figures

INVENTORS
ARMAND CHICHEPORTICHE, RENÉ LOUIS VALLÉE
AND PIERRE VERGEZ

BY Craig, Antonelli, Stewart & Hill

ATTORNEYS

APPARATUS FOR SAMPLING RAMDOM PULSE

This invention relates to an apparatus for extracting pulses from a train $I_x$ of pulses of random duration and position in accordance with orders represented by the pulses of another train $I_a$ of random pulses of the same type.

It frequently proves necessary to control a device for measuring or processing numerical information by means of selected pulses in a train of random pulses. This is particularly the case when it is required to establish asynchronous connections between systems or computers which have independent "clock" functions.

The sampling apparatus in accordance with the invention is intended to provide a solution to the problems mentioned above. The design function of the apparatus is to extract from a train of pulses $I_x$ of fixed amplitude and of random duration as well as position only the initial pulse which appears after the leading edge of the pulses of a second train of pulses $I_a$ which also have a random character under the same conditions.

Said sampling operation is illustrated in FIG. 1 which shows with a common time scale the series or train $I_a$ of drive pulses (line A), the train $I_x$ of pulses to be sampled (line B) and the train $I_s$ of output pulses (line C). $x$ is a random binary variable, $a$ is the order of extraction and $s$ designates the output signal.

Each pulse of the train $I_x$ which satisfies the conditions of selection must be extracted entirely or, in other words, the width of the selected pulse must be identical with the width of the selected pulse even if the drive pulse terminates before this latter. In consequence, the first pulse whose leading edge appears during a pulse $I_a$ is considered as the initial pulse $I_x$.

If the transition $0 \to 1$ of $a$ takes place during a pulse $x$ which is the case of $\alpha$ in FIG. 1, the following pulse is accordingly considered as the initial pulse and this latter will be extracted without considering any occurrence prior to the transition $0 \to 1$ of $a$.

An apparatus in accordance with the present invention is characterized in that the pulses of the two trains ($I_x$ and $I_a$) excite a combinational device which in turn drives the set and reset inputs of a flip-flop unit having four stable states, that the pulses of said two trains also drive one input of a bistable unit through a second combinational device, that the complement of the output quantity of the flip-flop unit is fed back to the input of the second combinational device, that the output quantity of the bistable unit is fed back to the input of the first combinational device and that the output of said bistable unit as well as the first train of random pulses are applied respectively to the two inputs of an AND circuit which selects the sampled pulses.

The following description relates to a first embodiment which is noteworthy for the achievement of maximum economy of means and also to a second embodiment in which the bistable unit has been subdivided by way of example into AND circuits followed by inverters.

The first of these apparatuses makes use of a flip-flop unit having four stable states and of the direct type, that is to say a flip-flop unit which is set by the leading edges of the pulses which are applied thereto while the second apparatus comprises a flip-flop unit having four stable states and of the reverse type, that is to say which is set by the trailing edges of the input pulses.

Finally, it will be noted that in this sampling apparatus, the flip-flop unit can be replaced by a bistable unit associated with a single-pulse generator.

Apart from the main features which have just been set forth, the invention also relates to a number of different secondary arrangements which will be described hereinafter.

The random pulse operation of the sampling apparatus according to the invention makes it possible to contemplate a large number of applications in nuclear measurement systems; the apparatus can serve as a coincidence circuit associated with a linear gate or it can constitute the input circuit of a multichannel selector. Finally, when the apparatus is combined with a clock and a bistable multivibrator, it can perform the function of time coder with width comparison of the outgoing and incoming signals.

In order that the present invention may be more readily understood, a general scheme as well as two constructional embodiments will now be described and, as will be understood, are not intended to set any limitation on the modes of operation or on the potential applications of this invention.

Figure 2:
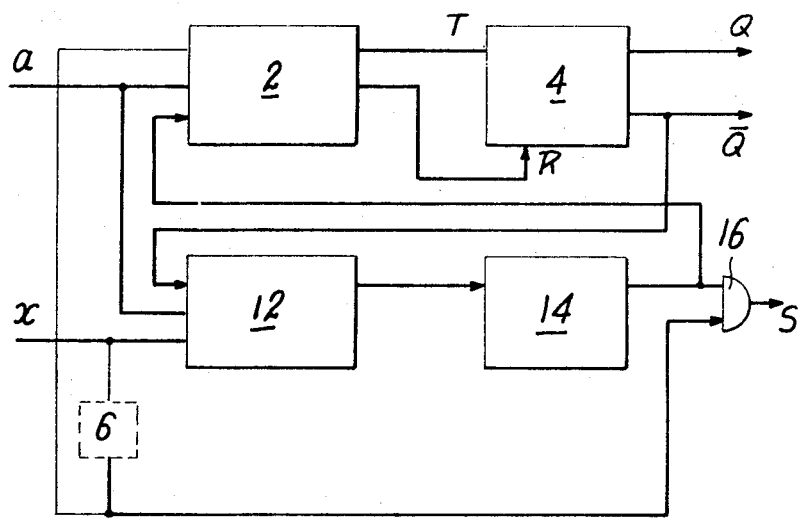
Figure 3:
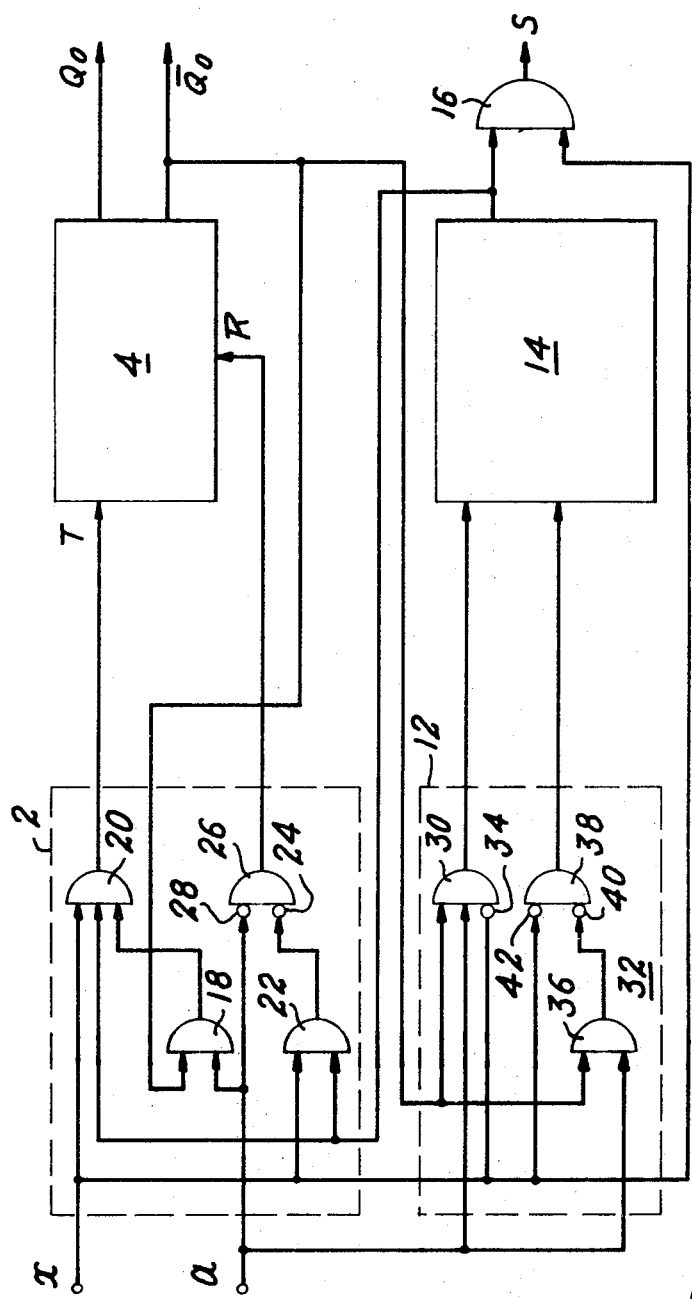
Figure 4:
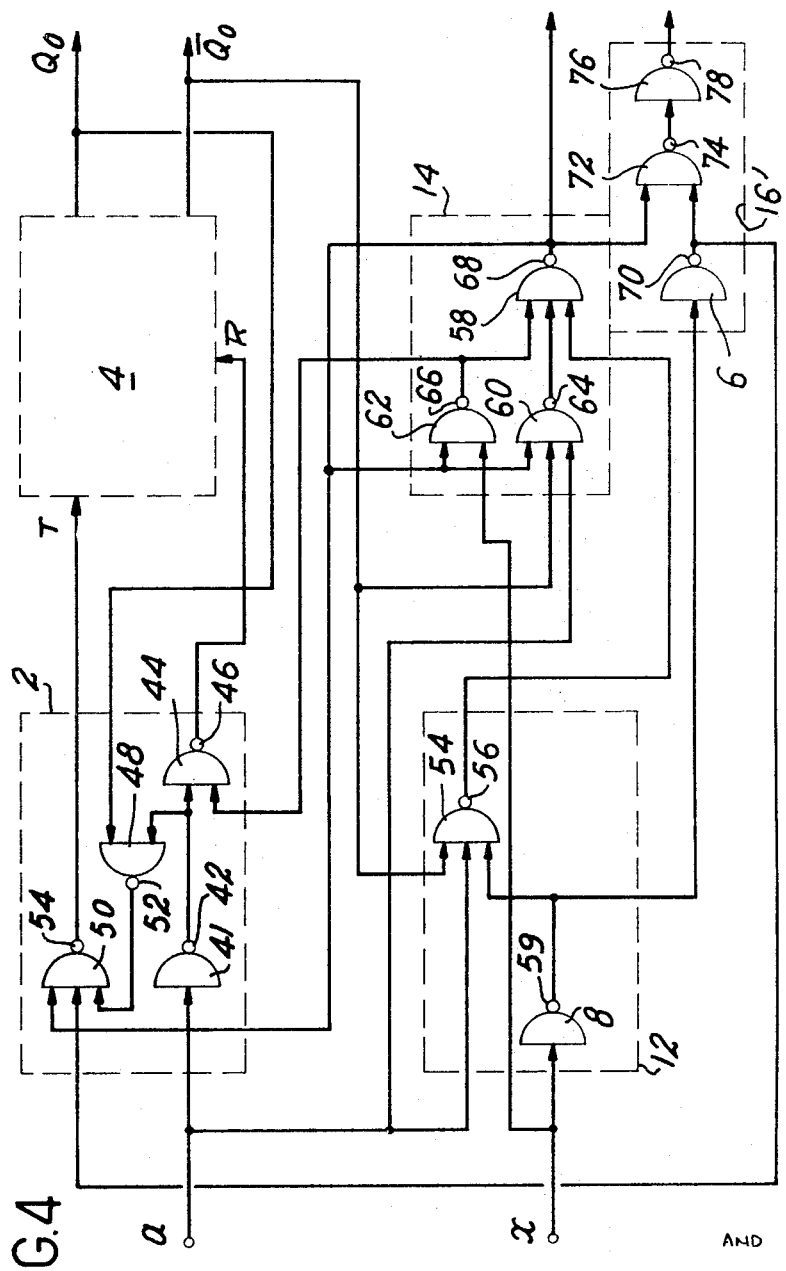

In the drawings:

FIG. 2 is a block diagram showing the structure of the apparatus;

FIG. 3 relates to a first embodiment of said apparatus;

FIG. 4 relates to a second embodiment in which the bistable unit is subdivided into AND circuits followed by inverters in order to provide a clearer understanding.

The pulses of the trains $I_x$ and $I_a$ are applied to the inputs of a combinational device 2, the outputs of which drive a flip-flop unit 4 having four stable states at its set output T and reset output R. Said flip-flop unit has an output which delivers the signal Q and a complementary output which delivers the signal $\bar{Q}$. It will be noted that the time-delay device 6 for delaying the pulses of the train $I_x$ is employed only in one embodiment of the invention which is illustrated in FIG. 4, in which the device is constituted by two assemblies 8-59 and 6-70 each consisting of a delay device and inverter.

The flip-flop unit 4 is of the type described in French Pat. No. 1,435,092 entitled "Method of regulating an electronic assembly having four stable states of equilibrium and device for the application of said method," and is constituted by two elements each having two stable states of equilibrium, the outputs of the first element being coupled to the inputs of the second element and conversely the outputs of said second element are coupled to the inputs of the first element.

The pulses of the two trains $I_x$ and $I_a$ are also applied to the combinational device 12 which in turn drives the bistable unit 14. The complementary output signal of the flip-flop unit 4 is fed back into the combinational device 12 while the output of the bistable unit 14 is applied to the input of the combinational device 2.

Finally, the pulses of the train $I_x$ as well as the output signal of the bistable unit 14 are applied to an AND circuit 16 which selects the desired pulses.

There will now be described a first embodiment of FIG. 2 which is of particular interest by virtue of the fact that it calls for a minimum number of elements as stated earlier.

FIGS. 2, 3 and 4 comprise identical elements which are designated by the same reference numerals. Only those elements of FIG. 3 which do not appear in FIG. 2 will therefore be described.

The combinational device 2 comprises two assemblies which drive respectively the set and reset inputs of the flip-flop unit 4. The first assembly is constituted by the OR circuit 18 and by the AND circuit 20. The OR circuit 18 has two inputs to which are respectively applied the drive pulses $a$ and the complement of the output signal of the flip-flop unit 4. Said OR circuit 18 is followed by an AND circuit which has three inputs and the output of which drives the set input T of the flip-flop unit 4; said three inputs are coupled respectively to the output of the OR circuit 18, to the source of pulses to be sampled $I_x$ and to the output of the bistable unit 14.

The second assembly comprises an AND circuit 22 having two inputs and an AND circuit 26 having two inputs each preceded by an inverter 24, 28; the two inputs of the AND circuit 22 are coupled respectively to the output of the bistable unit 14 and to the source of pulses to be sampled. The output of the circuit 22 is coupled through the inverter 24 to one input of the AND circuit 26 whose second input is coupled through the inverter 28 to the source of drive pulses $I_a$; the output of said AND circuit drives the reset input R of the flip-flop unit 4.

The combinational device 12 comprises two assemblies which drive respectively the inputs of the bistable unit 14. The first assembly is constituted by an AND circuit 30 having two inputs, one of which is preceded by an inverter 34 and the output of which is coupled to the input for setting the bistable unit 14 into state "1." The second assembly 32 of two AND circuits 36, 38 drives the second reset input of the bistable unit;

the two inputs of the second AND circuit 38 being each preceded by an inverter 40, 42.

The inputs of the AND circuit 30 are respectively coupled to the auxiliary output of the flip-flop unit 4, to the source of drive pulses $I_a$ and to the source of pulses to be sampled $I_x$ through an inverter 34.

The AND circuit 36 of the assembly 32 has two inputs which are coupled respectively to the auxiliary output of the flip-flop 4 and to the source of drive pulses $a$, the output of said circuit being coupled to the second AND circuit 38 thorough an inverter 40 while the second input of said AND circuit is coupled through an inverter 42 to the source of pulses to be sampled.

When $x = a = 0$, that is to say when there is neither any pulse to be sampled nor any drive pulse, the output voltage Q of the flip-flop unit is equal to 0 and the same applies to the output voltage of the bistable device 14 ($Y = 0$).

The bistable unit produces a signal which represents 1 when there is a drive pulse ($a = 1$) and when there is no pulse to be sampled $x = 0$. Under these conditions, a signal $x$ can be extracted if it appears.

In order that predetermined pulses of the train $I_x$ should be completely extracted, the changeover to 1 of $x$ when $Y = 1$ results in $Q = 1$. The disappearance of a pulse from the train $I_x$ ($x = 0$) causes the return to 0 of the bistable unit ($Y = 0$).

The flip-flop unit 4 locks the apparatus and prevents a further extraction of a pulse $I_x$ as long as $a$ has not returned to 0, in which case the output voltage of the flip-flop unit returns to 0 under the action of the flip-flop reset signal which is equal to 1.

Any changeover of $a$ from 0 to 1 both in the presence and in the absence of "$x$" necessarily results in extraction of the signal from the following pulse $I_x$ inasmuch as said changeover makes the output voltage of the flip-flop unit equal to 0 or maintains said voltage at this value.

The last embodiment of the invention as will now be described is characterized in that the bistable device is subdivided into AND circuits followed by inverters or AND-NOT circuits and has a slight disadvantage in that it comprises a slightly greater number of components.

In this example, the combinational device 2 is constituted by two AND-circuit assemblies followed by an inverter or AND-NOT circuits which drive the reset input R and set input T of the flip-flop unit 4. The first assembly is constituted by a first AND circuit 41 having a single input followed by an inverter 42 and by an AND circuit having two inputs 44 followed by an inverter 46; the output of said inverter is coupled to the reset input R of the flip-flop unit 4. The single input of the AND circuit 41 is coupled to the source of drive pulses $I_a$, the output of the inverter 42 is connected to one input of the AND circuit 44, the other input of this latter being coupled to an auxiliary output of the bistable unit 14.

The second assembly which drives the set input T of the flip-flop unit 4 is constituted by two AND circuits 48–50 which are each followed by an inverter 52–54. The first AND circuit 48 has two inputs which are coupled respectively to the output of the inverter 42 and to the output of the flip-flop unit 4. The second AND circuit 50 of said assembly comprises three inputs, one input being connected to the output of the inverter 52, the other receives the pulses $I_x$ which are delayed by the assemblies 8–59 and 6–70 as explained earlier, the third input is coupled to the output of the bistable unit.

The second combinational device 12 is particularly simple and essentially comprises a three-input AND circuit 54 followed by an inverter 56, the output of said inverter being connected to one of the inputs of an AND circuit 58 which forms part of the bistable unit; the inputs of said circuit 54 are connected respectively to the auxiliary output of the flip-flop 4, to the source of pulses $I_a$ and to the source of pulses $I_x$ by means of the delay device 8 and of the inverter 59.

The bistable unit 14 is constituted by three AND circuits 60–62 and 58 each followed by an inverter 64–66 and 68; the first AND circuit 62 has two inputs, one of which is coupled to the output of the bistable unit and the other being coupled to the source of pulses $I_x$; the circuit 60 has three inputs which are coupled respectively to the source of pulses $a$, to the auxiliary output of the flip-flop unit 4 and to the output of the bistable unit 14; the AND circuit 58 which constitutes the final stage of the bistable unit has three inputs, the first of which is connected to the output of the inverter 66 as well as to one input of the AND circuit 44, the second input being connected to the output of the inverter 64 and, as has been explained earlier, the third input is connected to the output of the inverter 56; the output of the inverter 68 constitutes the output of the bistable unit.

In regard to the use of the AND circuits followed by inverters, the circuit 16' has a structure which is slightly different from the circuit 16. It comprises an AND circuit 6 which only has a delay function followed by an inverter 70, and AND circuit 72 having two inputs and followed by an inverter 74, the first input of said AND circuit being coupled to the output of the inverter 70 and the second input being coupled to the output of the bistable unit and, finally, a delay device 76 followed by an inverter 78; the output of said inverter constitutes the output $s$ of the apparatus.

What we claim is:

1. An apparatus for sampling a train $I_x$ of pulses of random duration and position wherein, the sampling operation being controlled by the pulses of a second train $I_a$ of pulses of the same type, the pulses of both trains excite a combinational device which in turn drives the reset and set inputs of a flip-flop unit having four stable states of equilibrium, the pulses of said two trains also excite a second combinational device which drives one of the inputs of a bistable unit, the complement of the output quantity of the flip-flop unit is fed back to the input of the second combinational device, the output quantity of the bistable unit is fed back to the input of the first combinational device, and the output of said bistable unit as well as the first train of random pulses are applied respectively to the two inputs of an AND circuit which selects the sampled pulses.

2. A sampling apparatus according to claim 1, wherein the flip-flop unit is direct or in other words is set by the leading edges of the pulses which are applied thereto; wherein the first combinational device comprises:

a. an OR circuit having two inputs coupled respectively to the source of drive pulses and to one output of the flip-flop unit as well as an AND circuit having three inputs coupled respectively to the output of said OR circuit, to the output of the bistable unit and to the source of pulses to be sampled, the output of said AND circuit being coupled to the set input of the flip-flop unit;

b. a second AND circuit having two inputs coupled respectively to the output of the bistable unit and to the source of pulses to be sampled, a third AND circuit having two inputs, one input being coupled through an inverter circuit to the output of the second AND circuit and the other input being coupled through another inverter circuit to the source of drive pulses, the output of the third AND circuit being intended to drive the reset input of the flip-flop unit;

and wherein the second combinational device comprises:

a. an AND circuit whose output is coupled to one input of the bistable unit, said circuit having three inputs which are coupled respectively to the auxiliary output of the flip-flop unit, to the source of drive pulses and through an inverter to the source of pulses to be sampled;

b. a second AND circuit whose two inputs are coupled respectively to said auxiliary output of the flip-flop unit and to the source of drive pulses and a third AND circuit also having two inputs coupled respectively through a second inverter and a third inverter to the output of the second AND circuit and to the source of pulses to be sampled, the output of said second AND circuit being coupled to the second input of the bistable unit.

3. A sampling apparatus according to claim 1, wherein the flip-flop unit is of the reverse type or in other words is set by the trailing edges of the pulses which are applied thereto, wherein the first combinational device comprises:
a. an AND-NOT circuit having two inputs coupled respectively to the main output of the flip-flop unit and to the source of drive pulses through an inverter preceded by a delay device, a second AND-NOT circuit having three inputs and whose output is coupled to the set input of the flip-flop unit, the three inputs being coupled respectively to the output of the first AND-NOT circuit, to the source of pulses to be sampled through a delay device and to the output of the bistable unit;
b. a third two-input AND-NOT circuit whose output is coupled to the reset input of said flip-flop unit, the two inputs being coupled respectively to the output of said assembly comprising an inverter and delay device and to an auxiliary output of the bistable unit;

and wherein the second combinational device comprises:
an AND-NOT circuit having three inputs, the output of said circuit being coupled to one input of the bistable unit and said three inputs being coupled respectively to the source of pulses to be sampled through an inverter preceded by a delay device, to the source of drive pulses and to the auxiliary output of the flip-flop unit.

4. A sampling apparatus according to claim 1, wherein the flip-flop unit is replaced by a bistable unit associated with a single-pulse generator.

* * * * *